Patented Feb. 26, 1929.

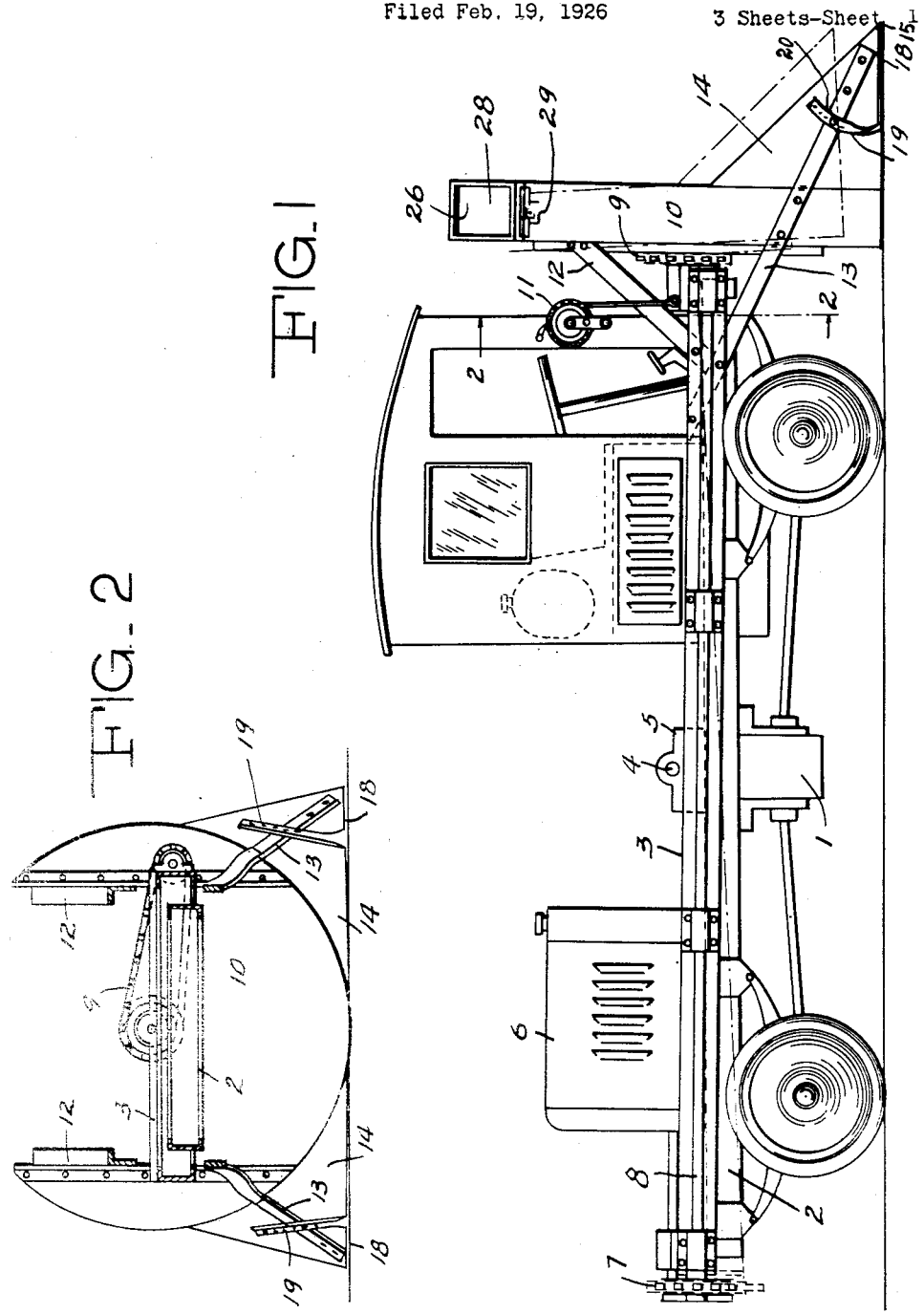

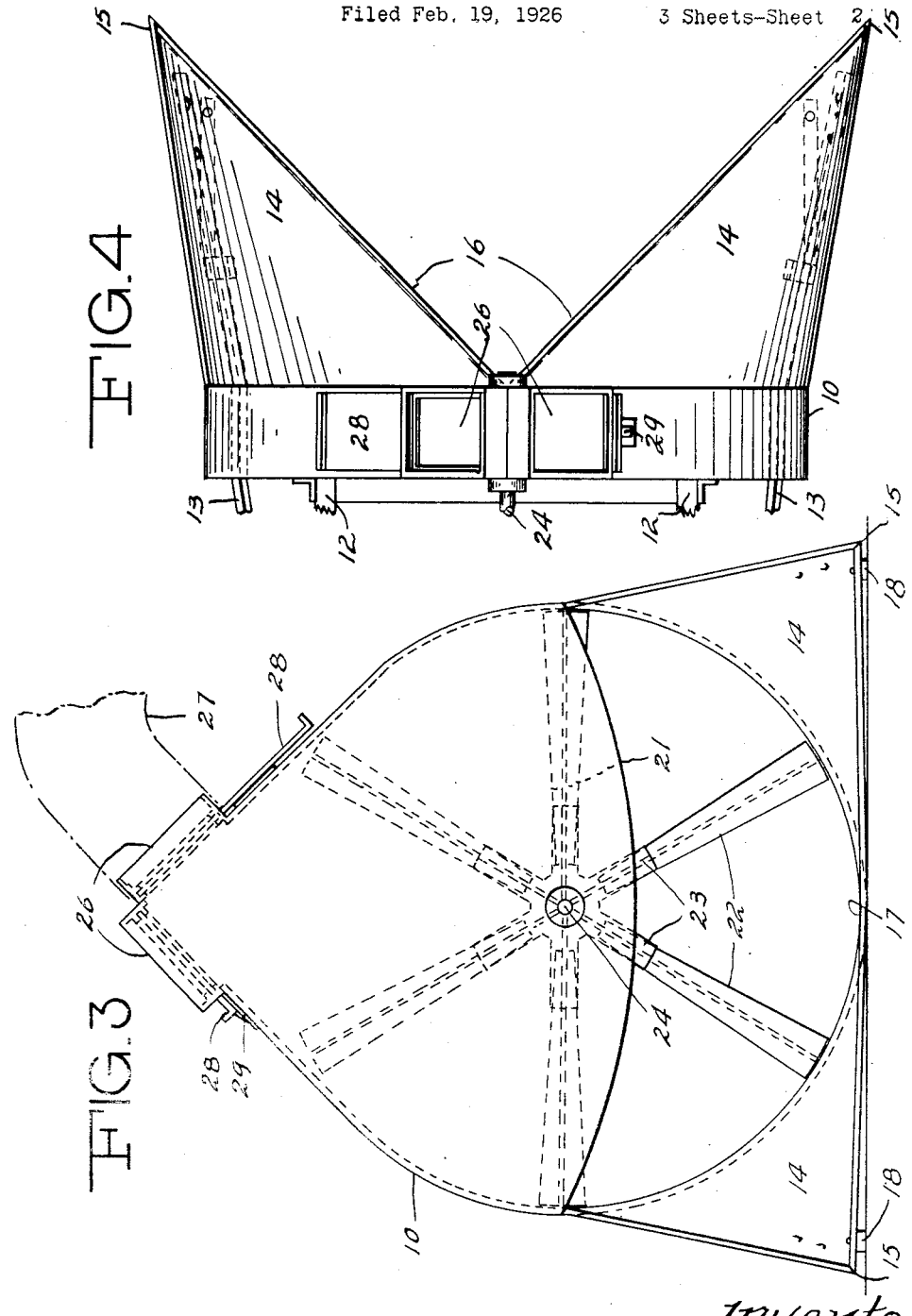

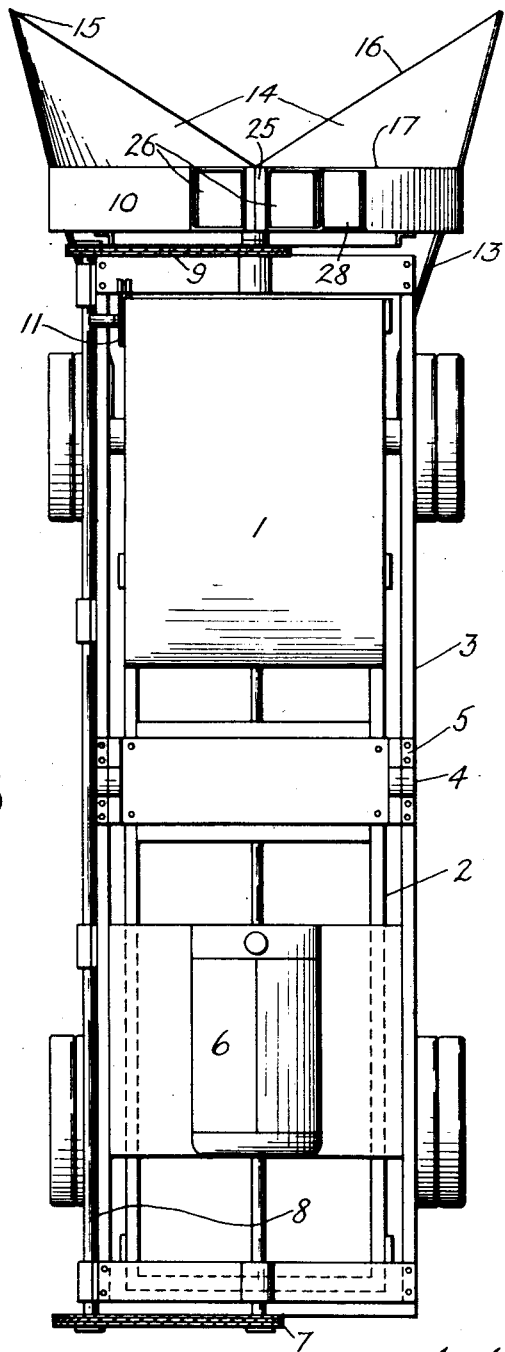

1,703,786

UNITED STATES PATENT OFFICE.

ARTHUR SICARD, OF MONTREAL, QUEBEC, CANADA.

SNOW-REMOVING MACHINE.

Application filed February 19, 1926. Serial No. 89,351.

This invention relates to snow removing machines, particularly of the class adapted in combination with a self-propelled vehicle, for the purpose of clearing the snow off the roads and highways.

The principal object of this invention is to cut and remove the snow entirely, much faster and better than can be done by expert hand labor.

Another object is to provide a means of removing the snow and shoot it at reasonable distances or to load it immediately and continuously into accompanying wagons.

A further object is to provide an arrangement of action that can be relied upon for removing the snow within a predetermined level of the road. This arrangement enables the snow removing mechanism to be clear off the road, when travelling inactively.

These objects and other advantages will be found in the following description and shown in the accompanying drawings, in which:

Figure 1 is a side view, in elevation, of an automobile truck incorporating the invention.

Figure 2 is a rear view of the fan-blower arrangement, taken on the line 2—2 of Figure 1.

Figure 3 is a front view of the same arrangement, showing the relative position of the snow cutting blades in front thereof.

Figure 4 is a top view of the same arrangement, showing the particular construction of the said snow cutting blades, and Figure 5 is a plan view of the complete device.

Similar reference characters represent similar parts in all the views.

A preferred construction and arrangement of this invention is shown and described as follows: An automobile truck 1, self-propelled and having its rear end of a bare chassis 2, forms the guiding and supporting means for the entire snow removing mechanism, which is mounted on its own frame 3 surrounding the chassis 2 on its four sides and slightly raised therefrom. The frame 3 is fastened to the chassis 2, by means of a transverse shaft 4 mounted within suitable bearings 5, so as to rock longitudinally thereon and having its forward end heavier proportionately for the weight required in the operation. The frame 3 is suitably guided around the chassis 2, so as to prevent side swaying. Mounted on the rear end of the frame 3, is a power unit 6 transmitting a predetermined force and speed through gear and chain connection 7, shaft 8 and another gear and chain connection 9, to a fan-blower 10. A windlass 11 is fixed to the elevated front part of the truck 1, for the purpose of raising and lowering the front part of the frame 3. The fan-blower 10 is rigidly secured, to the frame 3, by means of suitable braces 12 and 13. Immediately in front of the fan-blower 10 and integral with the lower portion thereof are a pair of spear-shaped cutting blades 14, rounded symmetrically to the periphery of the fan-blower 10, their pointed ends 15 set the furthest apart from each other and for the width of the snow path desired; and, their sharpened edges 16 meet at the lowest point of the fan-blower front 17, which is open to almost the horizontal center line thereof, where terminates the highest point of the blades 14. The braces 13 project, beyond the fan-blower 10, to the ends 15, of the blades 14, for their support. A skate 18 is mounted near each end 15 and its upturned member 19 is arranged to form an elevating means for the blades 14 from the ground; the members 19 being fastened by a bolt 20 to each brace 13.

The fan-blower 10 incorporates a specially designed fan 21 consisting of several H-shaped blades 22, in order to effect a scooping rotary motion in either right or left direction; these blades 22 are rigidly mounted on spider shaped plates 23 locked to the fan axle 24 actuated by the gear and chain connection 9. The top 25 of the fan-blower 10 is elongated to a point where two apertures 26 are formed angularly adjacent to each other, for the exit of the snow scooped by the blades 22. These apertures are suitably flanged, so that snow directing pipes 27 may be conveniently mounted over; as when it is desired to shoot the snow at a distance on either side of the road or when necessary to load it into accompanying wagons. A damper 28 is slidably mounted through and within these flanged apertures 26, for the necessity of closing either one that is not in use; a suitable spring catch 29 will lock the damper 28 in closed position.

When the truck 1 is travelling and the snow removing mechanism is inoperative, the frame 3 is raised by the windlass 11 (as shown by the dot and dash lines in Figure 1). This movement is facilitated by the flexibility of the gear and chain connections 7 and 9, which are the only united parts between the frame 3 and the chassis 2, except the hinged supporting shaft 4.

I am aware that there are many other patented machines of this type, but I believe that several novel features are herein incorporated and the same can also be modified greatly without departing from the spirit and scope thereof.

What I claim as my invention is:

1. A snow removing machine comprising a self propelled vehicle including a frame, a supplementary frame conforming to and surrounding the sides and ends of the vehicle frame, a power plant supported on the rear portion of said supplementary frame, a transversely extending pivot shaft connecting the medial portions of the two frames together to permit vertical rocking movement of the supplementary frame, a countershaft extending longitudinally of and journalled in suitable bearings carried by the outer surface of one side member of the supplementary frame, a gear and chain drive flexibly connecting the rear end of the countershaft to said power plant, braces secured to the side members of the supplementary frame and projecting downwardly and forwardly beyond the front member of said frame, a transversely arranged fan casing having opposite sides thereof secured to said braces immediately adjacent the front end of the supplementary frame and inwardly of the forward terminals of the braces, said fan casing having its lower half open at the front to provide an entrance thereto, a fan blower mounted in said casing, a gear and chain drive establishing a flexible connection between the front end of the countershaft and said fan blower, spear shaped snow cutting blades extending horizontally and outwardly from the lower portion of the casing, the points of the blades being spaced apart and the other ends of the blades being shaped to conform to the periphery of the housing and secured thereto, and the outer side portions of the blades being secured to the portions of the braces projecting downwardly and forwardly beyond the fan casing.

2. A snow removing machine as recited in claim 1 in which the upper portion of the fan casing is of substantially inverted V shape with openings formed in the casing immediately adjacent to and at opposite sides of the apex of the V and in which the blades of the fan blower are shaped to discharge the snow upwardly through one of said openings when the blades are rotated in one direction and through the other opening when the blades are rotated in the other direction whereby the snow delivered to the fan casing may be thrown upwardly and outwardly to either side of the road along which the machine is travelling.

3. A snow removing machine as recited in claim 1 including runners underlying the spear shaped blades at the pointed ends thereof, and provided with integral extensions projecting upwardly along the outer sides of said blade and adjustably secured to the aforementioned braces.

Signed at Montreal, Province of Quebec, Canada, this 16th day of February, 1926.

ARTHUR SICARD.